Jan. 7, 1930.  H. N. BERRY  1,742,493
COTTON PICKER
Filed Jan. 14, 1926   4 Sheets-Sheet 4
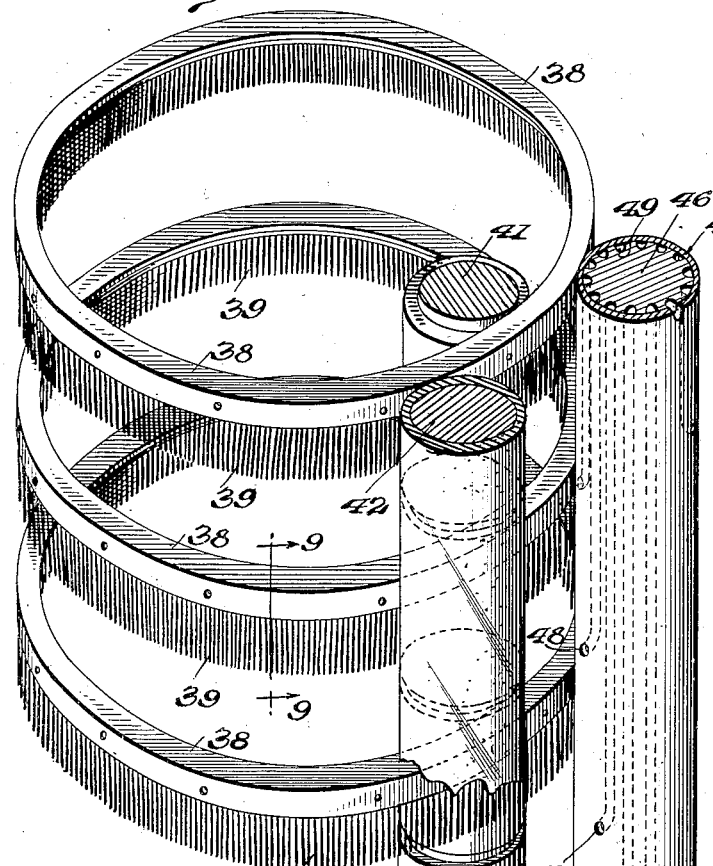
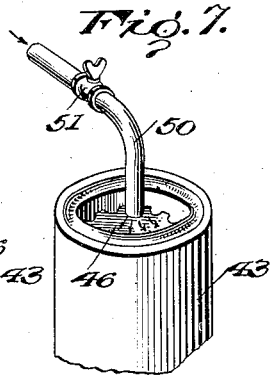
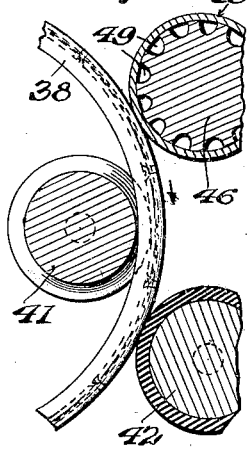
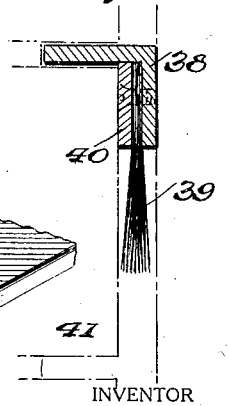
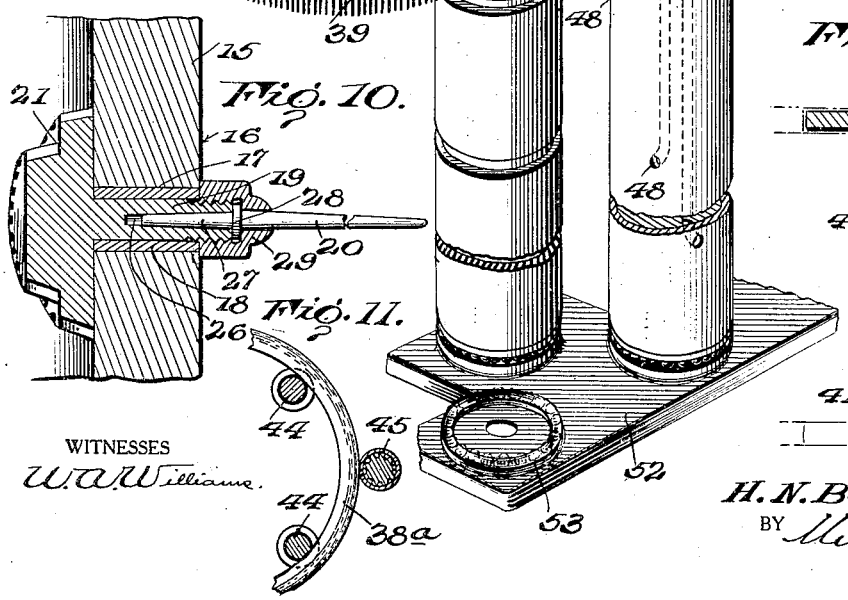
WITNESSES
W. A. Williams
INVENTOR
H. N. Berry.
BY
ATTORNEYS Patented Jan. 7, 1930

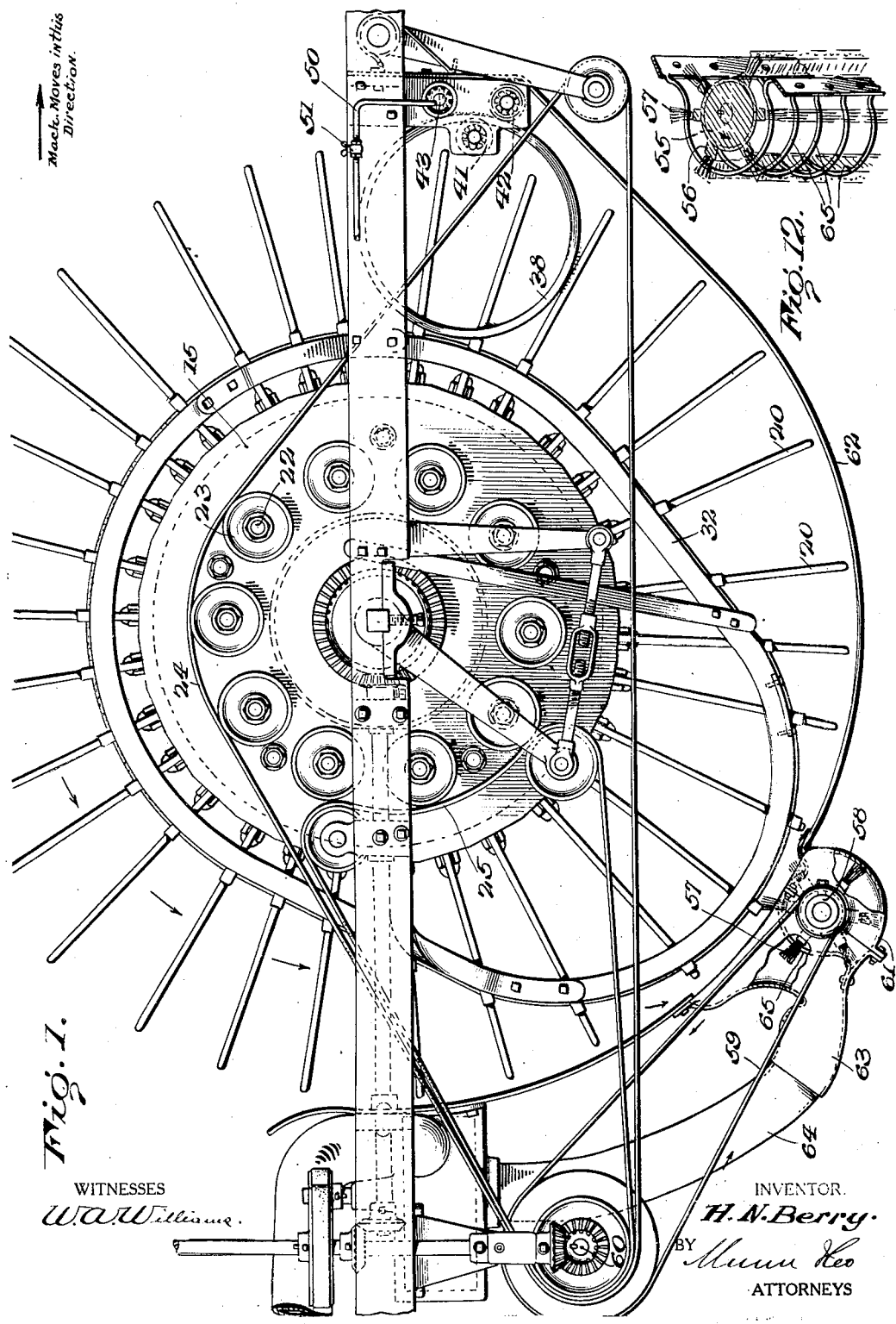

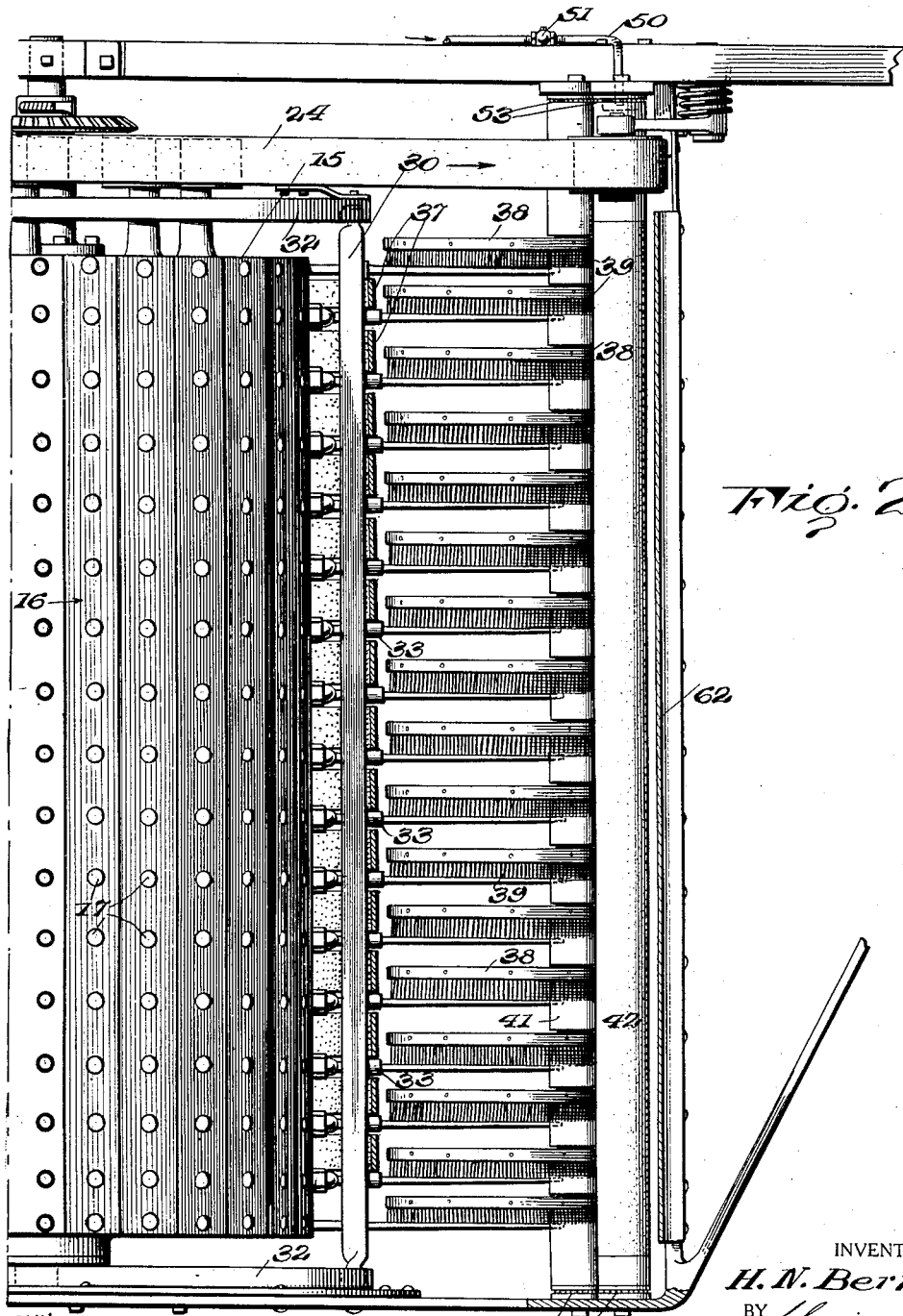

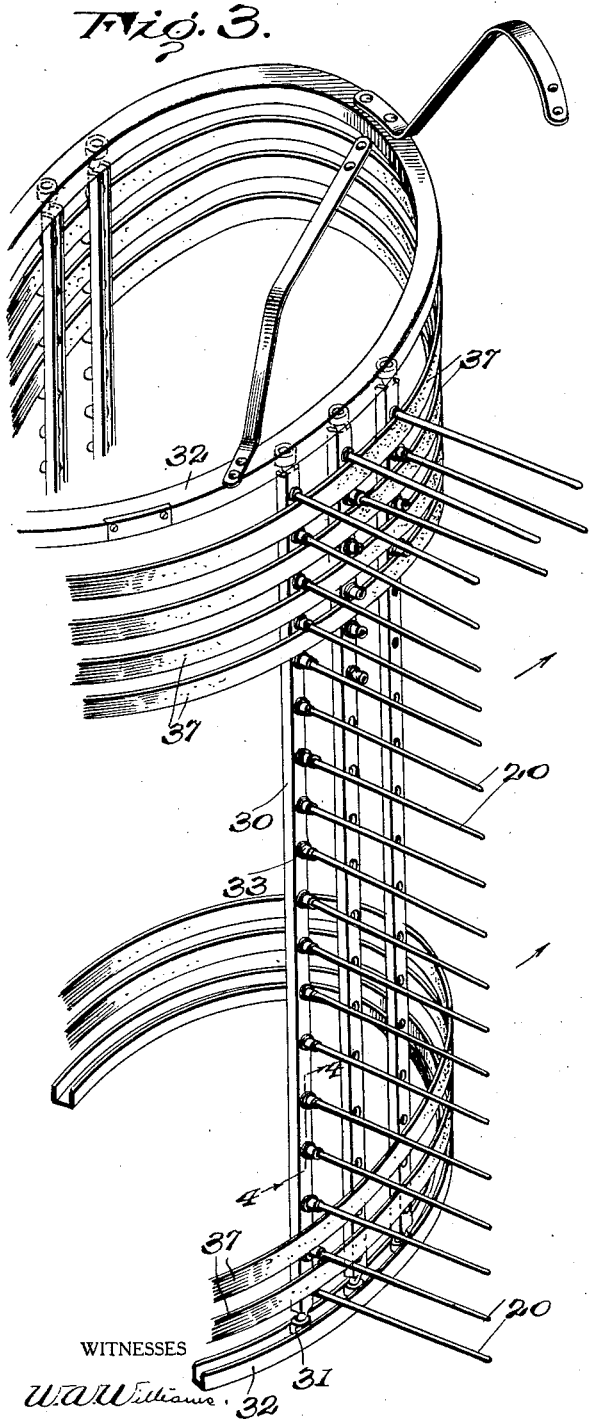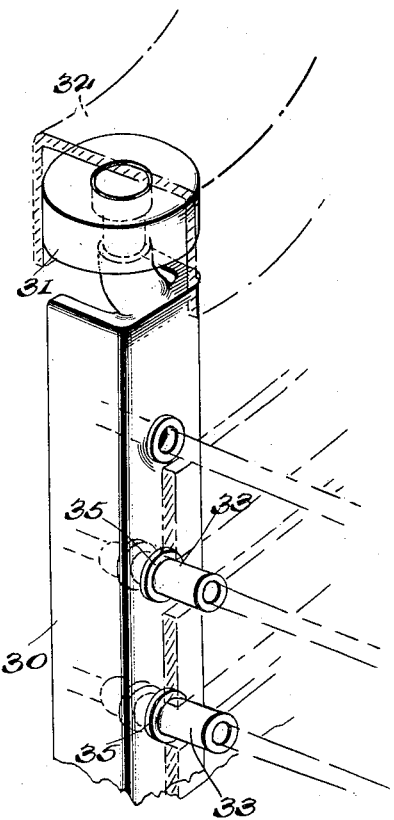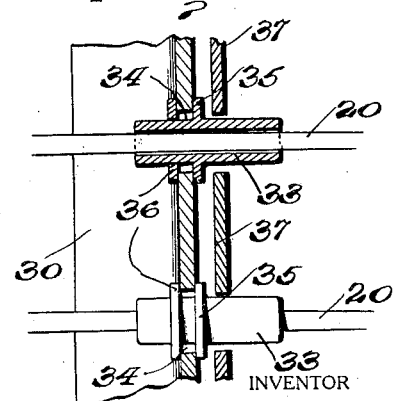

1,742,493

UNITED STATES PATENT OFFICE

HIRAM NEWTON BERRY, OF GREENVILLE, MISSISSIPPI, ASSIGNOR, BY DIRECT AND MESNE ASSIGNMENTS, TO COTTON HARVESTER CORPORATION OF AMERICA, OF GREENVILLE, MISSISSIPPI, A CORPORATION OF DELAWARE

COTTON PICKER

Application filed January 14, 1926. Serial No. 81,341.

My present invention relates generally to cotton pickers, and more particularly to cotton pickers of the type described and claimed in my Patents #1,530,151 dated March 17, 1925 and 1,610,240, dated Dec. 4, 1926, as well as application, Serial Number 47,917 filed August 3, 1925, my primary object being the provision of certain means in the structure of the drums or cylinders, in the needle connections with the drums or cylinders, in the application of liquid to the needles, in the needle stripper bars, and in the cotton take-off arrangement, as well as the provision of means designed to avoid the collection and packing of cotton on the needles inwardly beyond the stripper bars.

In my first patent above referred to, I show a certain cylinder or drum construction and needle connections which I have now been able to improve in the interests of simplicity and economy, and I now propose a drum or cylinder which is polygonal in form, presenting a number of flat vertically disposed external faces along the central portion of each of which faces a vertical row of needles are arranged. According to my present invention I furthermore connect the needles in a novel manner which will insure their rigid union in an easy effective manner with the needle shafts and the gears located within the drums or cylinders for driving these shafts.

In my application #47,917 above referred to an apparatus was disclosed including a series of vertically disposed stripper bars through which each vertical row of needles were extended. These stripper bars were provided at their upper and lower ends with rollers disposed in upper and lower cam tracks functioning to guide the stripper bars and to shift the same outwardly along the needles at certain points for the purpose of shoving the collected cotton toward the needle ends for subsequent removal from the needles. In respect to this mechanism my present invention proposes certain improvements having for their primary object the elimination of all danger of lateral strain by the stripper bars against the needles themselves so as to avoid in this manner, danger of breakage of the needles.

In my application last mentioned I also proposed the use of needles having smooth surfaces and the adaptation of these needles to the efficient collection of cotton by applying liquid to the surfaces of the needles previous to their passage into the cotton plants. My present invention has as another object the provision of simple efficient means for thoroughly and uniformly applying liquid to the needles over the entire area of their effective surfaces.

In my second Patent 1,610,240 above mentioned, I further proposed the use of a vertical rotating take-off arrangement whereby the cotton is finally removed from the ends of the picking fingers in the presence of a suction operating to subsequently convey the picked cotton to a suitable collecting receptacle. My present invention presents an improved form of vertical rotatable take-off device and coacting means insuring complete removal of the cotton and effectively preventing cotton from loading up on the vertical rotating take-off member.

In addition to the foregoing, it has been demonstrated that more or less danger exists in the operation of a machine of this type owing to the possible collection of cotton on the picking fingers or needles behind the stripper bars. Gradual collection of cotton in this way becomes packed by the stripper bars as they move inwardly toward the surface of the drums or cylinders and in order to avoid this, my present invention aims to provide means of such nature as not to interfere with the desired action of the remaining parts and avoid complications and the addition of any considerable cost.

In the accompanying drawings which illustrate my present invention and form a part of this specification, Figure 1 is a top plan view of a picking drum or cylinder as well as a portion of the frame supporting the same, and the adjacent parts as proposed by my present invention, Figure 2 is a partial side elevation thereof with a shield broken away and in section, Figure 3 is a perspective view illustrating certain of the stripper bars, the stripper bar guides, and certain picking fingers or needles with a means therebetween to prevent cotton from passing along the needles from the front to the rear sides of the stripper bars, Figure 4 is an enlarged detail vertical section through a portion of one of the stripper bars, showing the needle or picking finger bearings, Figure 5 is a detail perspective view of the upper end portion of one of the stripper bars, Figure 6 is a detail perspective view showing certain portions of the liquid applying apparatus, Figure 7 is a detail perspective view of the upper portion of the rotatable liquid applying upright, Figure 8 is a detail horizontal section through certain of the parts shown in Figure 6, Figure 9 is a detail vertical section through one of the applying rings taken substantially on the line 9—9 of Figure 6, Figure 10 is a detail vertical section through a portion of the drum or cylinder illustrating the connecting means of one of the needles or picking fingers, Figure 11 is a horizontal sectional view through the parts shown in Figure 6, illustrating a slightly modified arrangement, and Figure 12 is a detail sectional perspective view of a portion of the brush for removing cotton from the picking cylinders and its casing.

Referring now to these figures, and more particularly to Figures 1, 2 and 10, I have shown the picking cylinder 15 in the present instance as of polygonal form, presenting vertical parallel flat surfaces 16 each of which has along its central portion a row of vertically spaced openings 17. In each opening 17 is a bushing 18 receiving therethrough a shaft 19 for the respective needle or picking finger 20. Each shaft 19 is in the present instance formed integral with the inner gears 21 connecting the picker shafts with the series of vertical shafts indicated at 22 on Figure 1, and having upper pulleys 23 which are actuated along the inner portion of the cylinder by an actuating belt 24 and which are reversed by a reversing belt 25.

Each picker shaft 19 has its outer end projecting slightly beyond the outer surface of the cylinder or drum 15, and is provided with an axial tapering socket 26 extending therein from its said outer end to receive the similarly tapering inner end 27 of the respective needle or picking finger 20. Moreover the outer end of each shaft 19 is externally threaded and each needle or picking finger 20 is provided adjacent to its inner tapering end with a rigid collar 28, the latter engaged by a flanged nut 29, which threads on the projecting end of the shaft 19 and which thus serves to clamp the collar 28 against the outer shaft end and at the same time force the tapering end 27 of each picking finger or needle tightly into the shaft socket 26 so as to thus bring about a double frictional grip which will serve in practice to hold the needles firmly in connection with their shafts and insure constant rotation thereof in use with minimum expense in the manufacture of the parts.

In practice there is sufficient clearance between the end of the nut and the adjacent surfaces of the members 15 and 18, so that the nut 29 may be screwed down very tightly upon the extremity of the shaft 19, thus to obviate every possibility of the tapered end 27 loosening in its socket 26. It will be thus understood that the tapered end 27 is intended to be jammed in the socket 26, yet leaving ample clearance between the inner surface of the nut and the adjacent surface 16 and the exposed end of the bushing 18.

In my application #47,917 I first proposed the use of a plurality of vertically disposed stripper bars through which the needles or picking fingers were extended, these stripper bars being movable with the rotation of the cylinder or drum and being guided in such movement so as to shift inwardly and outwardly along the fingers or needles, the outward shifting movement of the stripper bars being brought about after the needles have been withdrawn from the cotton plants, so that during such outward movement the prevously picked cotton will be forced outwardly along the needles to their extremities.

In the present application I have shown the several stripper bars at 30, with rollers 31 at their upper and lower ends movably disposed in rigid cam tracks 32, the latter suitably secured to adjacent portions of the cylinder supporting frame. In connection with this structure best shown in Figures 3, 4 and 5, my present invention proposes an improvement which consists in providing a plurality of tubular bearings or bushings 33 along each stripper bar for the reception of the picking fingers or needles 20. As seen particularly in Figure 4, these bearings or bushings 33 are extended through openings 34 in the stripper bar of substantially greater diameter than the bushings themselves. The bushings have rigid collars 35 adjacent to the outer or forward surfaces of the stripper bars, and similar collars 36 are shrunk or welded on the inner portions of the bushings adjacent to the inner or rear surfaces of the stripper bars so as to thus confine the bushings against displacement and still permit of their angular and lateral yielding in the openings 34 of the stripper bars whereby to avoid breaking strain upon the picking fingers or needles especially where one or more of the latter may be slightly bent or deflected out of its proper line.

In this way the stripper bars may slide easily and freely inwardly and outwardly along the picking fingers or needles, the surfaces of the needles or fingers will be preserved against gouging or other defacement, and friction which would otherwise result, is greatly reduced.

The drawings illustrate the exposed ends of the needles as being constructed on a slight taper. As has been brought out before, the bushings 33 are radially slidable in respect to the needles for the purpose of stripping cotton collected by the latter. The characteristic of the collected cotton is such that it can readily be stripped from the needles by the pushing action of the bushing, there being no tendency at all of wisps of cotton working back into the bore of the bushings.

There may be pronounced looseness between the needles and bores of the spindles so that a preceptible space becomes apparent, but even such space offers no invitation to the collection of cotton in the pushing action of the bushings. The foregoing action has been satisfactorily demonstrated in actual practice, and it has been found that stripping apparatus operating upon the foregoing principle acts exactly as intended and stated.

I have found moreover that in operation there is danger at times of portions of the cotton finding their way across the stripper bars as the latter move outwardly beyond needles or fingers, from those portions of the fingers outwardly beyond or in front of the stripper bars to those portions of the fingers inwardly beyond or to the rear of the stripper bars. It is obvious that when this happens there is no way in which to provide for proper discharge of the cotton which soon becomes packed around the inner portions or fingers of the needles between the stripper bars and the surface of the cylinder or drum. It thus becomes essential to prevent wisps of cotton thus passing around the stripper bars from the outer to the inner portions of the needles or fingers and to do this my present invention proposes the use of a series of flexible floating belts 37 disposed horizontally between the several rows of picking fingers or needles and immediately adjacent to the outer faces of the several stripper bars 30, as plainly seen in Figures 2 to 5 inclusive. These belts are freely disposed in place without direct connection to any other part of the apparatus, and not only serve to cover up the major portions of the spaces between the stripper bars adjacent to the fingers or needles, but may obviously occupy this space without danger of interfering with the action of the apparatus in any way. The belts may be formed of any suitable material as for instance fabric, leather, or possibly rubber, and inasmuch as no strain is placed thereon in their floating positions, the belts may well be expected to last indefinitely and in the long run, afford a simple and inexpensive mechanism to overcome the difficulty above noted.

In my application #47,917 above mentioned, I also proposed the use of picking fingers or needles having smooth surfaces together with the advantages derived from this construction more especially by the use of a liquid applied to the surface of the fingers before they are actually moved into the cotton plants, experience having shown that by such an attachment the cotton could be picked with equal effectiveness and efficiency as compared with the barbed needle or finger and subsequently discharged from the smooth fingers with much greater facility. I utilize various means for applying liquid to the needles with the main object the uniform distribution of liquid over the needle surfaces, and according to my present invention, I propose the use of a series of rings 38 of small diameter, disposed horizontally between the several rows of needles at one side of the cylinder or drum 15. These several rings, indicated at 38 in Figures 1, 2 and 6 are each provided with bristles 39 as shown in Figure 9, gripped between the angular bodies of the rings and inner clamping strips 40, and the several rings are freely disposed, one above each horizontal row of needles or fingers and float between the latter, the bristles of each ring resting upon the horizontal row of needles with which they are intended to cooperate. Moreover the several rings 38 are freely rotatable by the operation of the fingers or needles, the rings being disposed at one point between freely rotatable upright rollers 41 and 42 and 43, arranged either one within the rings and two without the same, as seen in Figure 6, or two within the ring and one without as indicated in Figure 11, where the ring is seen at 38ª, the inner rollers at 44, and the outer roller at 45. In any event, the roller or rollers within the rings will be peripherally shaped to conform to the angular shape of the rings themselves, and whether one or two rollers are utilized outside of the series of liquid applying rings, one outside roller (such as 43 in Figures 1, 6, 7 and 8, and 45 in the modified arrangement in Figure 11) will have a peripherally fluted core 46, the outer casing of the roller being provided with apertures 48 through its surface opposite to each of the rings 38, and in line with one of the vertical peripheral grooves 49 of its core 46.

As shown in Figure 7, the upper end of the casing of roller 43 is extended above the upper end of its core 46 and into the space thus formed, liquid for application to the picking fingers or needles is supplied through a liquid supply pipe 50 having therein a controlling valve 51. The liquid thus deposited within the upper end of roller 43 finds its way equally into all of the vertical grooves 49 of the core 46 as the core and its casing are rotated through the rotation of the rings 38 by the needles and downwardly in these grooves and then outwardly through the openings 48 of the roller casing to the edges of the rings 38, the liquid running down over the roller edges of the rings and onto the bristles 39, whence it is transferred to the needles 20 as the needles wipe through the bristles.

The question may present itself to the mind of the reader why the liquid would not spurt out in radial directions at the apertures 48. In answer to such possibility, it is stated that the liquid used consists of a lubricant of relatively heavy body, the rate of flow of which it so low that it will only trickle over the surface of the roller casing and demonstrates no tendency whatever to spurt out. The flow of the liquid is gravitational only, and the liquid is not under pressure. It may be stated further, that in practice it is even sometimes necessary to heat the liquid to a certain extent in order to sufficiently reduce the viscosity so that it will readily flow.

By reference to Figure 6, it will be plainly seen that the several upright rollers rest upon a platform 52, secured to and forming a part of, the frame of the apparatus as a whole, and that in connection with this platform 52 and the upper portion of the frame of the cotton picking apparatus, the upper and lower ends of the rollers are provided with anti-friction bearings indicated at 53 so that rollers may rotate with especial ease on account of the mere frictional engagement between their surfaces and the several liquid applying rings 38 and the further fact that these latter rings are themselves simply rotated by virtue of the friction between the same and the fingers or needles they are intended to moisten.

In my Patent No. 1,610,240 above mentioned, I also propose means to actually pull the cotton off of the ends of the picking fingers or needles, in view of the fact that I found that even where the stripper bars were utilized there was still a tendency of the cotton when pushed lengthwise of the fingers to collect at the finger ends and in some instances fail to discharge or release therefrom in the presence of the suction utilized to convey the picked cotton from the cylinders to suitable cotton receptacles on the machine. In my said application a vertically disposed drum was utilized in a casing partly open to picking cylinder and partly open to the suction pipe of conduit, the drum having curved barbs rotatable therewith immediately adjacent to the ends of the picker fingers so as to be certain in their action. Adjacent to the communicating end of the suction pipe or conduit these barbs in the rotation of the drum pass between inwardly curved lips so that the cotton removed by the barbs would in turn be freed from the barbs approximately within the mouth of the suction pipe.

The present application introduces combing means illustrated as a revoluble element consisting of a drum 55 as best shown in Figs. 1 and 12, provided along its periphery with circumferentially spaced longitudinally extending bristle bars 56, each of which has bristles 57 or equivalent means extending therealong. This drum is actuated by virtue of an upper pulley 58 driven by a belt 59 from the same upright shaft 60 of the apparatus which drives the needle actuating belt 24 and the reversing belt 25, as will be seen in Figure 1. The drum 55 thus forms a brush and can be adjusted so the bristles 57 actually contact with the picking fingers or needles without danger to the latter. The brush so formed is mounted in a vertical casing 61 within the shield 62 which surrounds the outer side of the picking cylinder as in my Patent No. 1,610,240 above referred to and this casing 61 is in communication through a tapering extension 63 with the suction or cotton discharge pipe 64.

Within the casing 61 housing the brush there is moreover provided an arrangement for insuring release of the cotton from the bristles 57, this arrangement consisting of a series of vertically spaced cross bars 65 which as best seen in Fig. 12 are curved to partially surround the drum 55 within the limits of the bristles 57 so that the latter in their rotation pass between the cross bars 65, the latter being sufficiently close together to loosen any balls of cotton adhering to the bristles sufficiently to permit the suction to readily draw such balls into the discharge pipe 64, the said cross bars 65 being disposed as best seen in Fig. 1, immediately at one side of the tapering extension 63 of casing 61 and thus immediately within the influence of the suction through pipe 64.

It is thus obvious from a careful consideration of the foregoing that my present invention proposes a number of refinements which have been developed in the course of practical use of the apparatus included in my patent and my applications first above referred to, and that these refinements both structural and otherwise are such as to increase effectiveness and efficiency from a practical standpoint, eliminate undesirable complications, and produce a more lasting and more economical cotton picking apparatus as a whole.

I claim:—

1. In a cotton picker of the type described, a picking cylinder including a vertically disposed polygonal drum presenting a plurality of vertically flat parallel surfaces and having a vertical series of openings centrally of each of said surfaces, shafts journaled through the said openings and having gears at their inner ends and axial tapering sockets extending therein from their outer ends, picking fingers adapted to radially outstand from the drum and having tapering inner portions to extend into said sockets and rigid collars adjacent to said tapering portions and flanged connecting nuts engaging the collars on the fingers and threaded on the outer ends of the shafts to force the tapering portions of the fingers tightly into the shaft sockets.

2. In a cotton picker of the character described, supporting and actuating means for the picking fingers including shafts having axial tapering sockets within the outer ends thereof and having their said outer ends threaded and flanged nuts engaging the threads upon the outer ends of the shaft, the picking fingers having inner tapering ends, and collars adjacent to the said ends for engagement by the flanged nuts to force the tapering ends of the fingers in secure frictional engagement within the sockets of the shafts.

3. In a cotton picker including a picking cylinder having peripherally outstanding picking fingers, and stripper bars rotatable with the cylinder and having guided movement lengthwise of the fingers for shifting the picked cotton outwardly along the latter, the picking fingers being arranged in horizontal rows, a series of flexible protecting strips encircling the cylinder and the series of stripper bars, said protecting strips being loosely disposed between the horizontal rows of fingers immediately adjacent to the outer surfaces of the stripper bars, for the purpose described.

4. In a cotton picker, a picking cylinder having peripherally outstanding picking fingers, and means including vertically disposed stripper bars rotatable with the cylinder and having guided movement lengthwise of the picking fingers for shifting cotton outwardly along the fingers, and means to prevent accidental movement of cotton around the stripper bars from the outer to the inner portions of the picking fingers.

5. In a cotton picker, a picking cylinder having peripherally outstanding picking fingers, and means including vertically disposed stripper bars rotatable with the cylinder and having guided movement lengthwise of the picking fingers for shifting cotton outwardly along the fingers, means to prevent accidental movement of cotton around the stripper bars from the outer to the inner portions of the picking fingers, said means including a series of floating belts of flexible nature closely surrounding the series of stripper bars and between the picking fingers.

6. In a cotton picker, a picking cylinder having peripherally outstanding picking fingers, a series of vertically disposed stripper bars movable with the cylinder, means for shifting said stripper bars along the picking fingers, each of the stripper bars having openings through which the picking fingers extend and having tubular members around the picking fingers and movably confined within said openings.

7. In a cotton picker, a picking cylinder having peripherally outstanding picking fingers, a series of vertically disposed stripper bars around and movable with the cylinder, means for shifting said stripper bars inwardly and outwardly along the picking fingers, each of said stripper bars having openings through which the picking fingers extend, tubular members surrounding the picking fingers and within and of less diameter than the said stripper bar openings, each of said tubular members having means engaging the inner and outer surfaces of the stripper bar, arranged to movably confine the member within its respective opening.

8. In a cotton picker, a picking cylinder having peripherally outstanding picking fingers, a series of stripper bars around and movable with the cylinder, means for shifting said stripper bars inwardly and outwardly along the picker fingers and means carried by the stripper bars and surrounding the picking fingers whereby to shift the picked cotton outwardly along the fingers, said means being yieldable laterally and angularly with respect to the stripper bars, whereby to avoid strain on the picking fingers.

9. In a cotton picking apparatus including a picking cylinder having radially outstanding picker fingers movable therewith, means for moistening said fingers including a vertical series of moistening rings extending horizontally for the major portions thereof between the fingers at one side of the cylinder, said rings being provided with bristles and resting freely between and upon the fingers for rotation by virtue of the movement of the fingers with the cylinder, and a series of rotatable uprights arranged beyond peripheries of the picking fingers to receive portions of the said rings movably therebetween whereby to confine the rings against lateral displacement, one of said uprights having a shell, and a fluted core within the shell, the shell being provided with openings therethrough located opposite the several rings and communicating with the flutes of the core, and means for supplying liquid within the upper end of the last mentioned roller and into the flutes of the core thereof.

10. In a cotton picking apparatus including a picking cylinder having radially outstanding picking fingers movable therewith, means for moistening said fingers including a series of floating rings freely disposed horizontally between and in contact with said fingers, and at one side of the cylinder, and means for supplying liquid to said rings.

11. In a cotton picking appartaus including a picking cylinder having radially outstanding picking fingers movable therewith, a series of moistening rings extending freely between the picking fingers at one side of the cylinder and rotatable by virtue of their contact with said fingers.

12. In a cotton picking apparatus including a picking cylinder having radially outstanding picking fingers movable therewith, a series of moistening rings extending freely between the picking fingers at one side of the cylinder and rotatable by virtue of their contact with said fingers, and rotatable uprights between which the rings movably extend at one point for holding the rings against lateral displacement.

13. In a cotton picking apparatus including a picking cylinder having radially outstanding picking fingers movable therewith, a series of moistening rings extending freely between the picking fingers at one side of the cylinder and rotatable by virtue of their contact with said fingers, rotatable uprights between which the rings movably extend at one point for holding the rings against lateral displacement, certain of said uprights having means to supply liquid to the rings.

HIRAM NEWTON BERRY.